United States Patent
Verhaegh et al.

(10) Patent No.: US 9,118,785 B2
(45) Date of Patent: Aug. 25, 2015

(54) COMPENSATING FOR IMAGE SENSOR PROFILE VARIATIONS

(75) Inventors: Gerard Verhaegh, Hillerød (DK); Troels Pedersen, Roskilde (DK); Lars Errebo Larsen, Roskilde (DK); Jens Kærgaard Nielsen, Værløse (DK)

(73) Assignee: Contex A/S, Allerod (DK)

( * ) Notice: Subject to any disclaimer, the term of this patent is extended or adjusted under 35 U.S.C. 154(b) by 125 days.

(21) Appl. No.: 13/877,329

(22) PCT Filed: Oct. 1, 2010

(86) PCT No.: PCT/EP2010/064657
§ 371 (c)(1),
(2), (4) Date: Jun. 10, 2013

(87) PCT Pub. No.: WO2012/041391
PCT Pub. Date: Apr. 5, 2012

(65) Prior Publication Data
US 2013/0258418 A1    Oct. 3, 2013

(51) Int. Cl.
*H04N 1/193* (2006.01)
*H04N 1/00* (2006.01)
*H04N 1/401* (2006.01)

(52) U.S. Cl.
CPC ......... *H04N 1/00087* (2013.01); *H04N 1/193* (2013.01); *H04N 1/1934* (2013.01); *H04N 1/401* (2013.01)

(58) Field of Classification Search
CPC ......... H04N 1/40; H04N 1/403; H04N 1/484; H04N 1/486; H04N 1/40056; H04N 1/2032; H04N 1/00002; H04N 1/6033; H04N 1/193
See application file for complete search history.

(56) References Cited

U.S. PATENT DOCUMENTS

| 4,314,281 A | 2/1982 | Wiggins et al. |
| 2003/0193700 A1* | 10/2003 | Kubo .................... 358/475 |
| 2009/0180156 A1 | 7/2009 | Yoshimaru et al. |
| 2009/0207450 A1* | 8/2009 | Nagamochi ............. 358/2.1 |

FOREIGN PATENT DOCUMENTS

| EP | 0439357 A2 | 7/1991 |
| JP | 2002-247311 A | 8/2002 |
| JP | 2007-19853 A | 1/2007 |
| JP | 2009-141580 A | 6/2009 |
| JP | 2010-136164 A | 6/2010 |
| WO | 2009/138255 A1 | 11/2009 |

OTHER PUBLICATIONS

Machine translation of JP2009-141580 to Arakawa et al.*
Office Action received for Japanese Patent Application No. 2013-530590, mailed on Jun. 19, 2014, 10 pages (5 pages of English Translation & 5 pages of Official copy).
International Search Report received for PCT Patent Application No. PCT/EP2010/064657, mailed on Mar. 8, 2011, 3 pages.

* cited by examiner

*Primary Examiner* — Benny Q Tieu
*Assistant Examiner* — Haris Sabah
(74) *Attorney, Agent, or Firm* — Morrison & Foerster LLP

(57) ABSTRACT

Disclosed is a method of scanning a physical medium by an image scanner comprising a first image sensor having a plurality of image sensor elements that provide an image, and a first light source associated with the first image sensor, the method comprising: guiding light from the first light source towards a first group of image sensor element(s); recording a first light calibration value using the first group of image sensor element(s). The method further comprises repeating the above step by using a second group of image sensor element(s) thus resulting in a second light calibration value; generating a first compensation signal for image sensor elements positioned between the first and the second group of image sensor element(s) by processing the first and the second light calibration value together; compensating said image signals provided by the first image sensor using the first compensation signal.

12 Claims, 9 Drawing Sheets

COMPENSATING FOR IMAGE SENSOR PROFILE VARIATIONS

CROSS REFERENCE TO RELATED APPLICATION

This application is a U.S. National Phase patent application of PCT/EP2010/064657, filed Oct. 1, 2010, which is hereby incorporated by reference in the present disclosure in its entirety.

FIELD

This invention generally relates to optical scanning of an object. More particularly the invention relates to compensation for light variations in optical scanners.

BACKGROUND

Optical scanners conventionally work by illuminating an object to be scanned with a light source and recording the reflected light from the object with an image sensor. Examples of image sensors are charge coupled devices (CCD) or contact image sensors (CIS). The object may be separated from the image sensor and the light source by a glass plate. The image sensor is typically arranged on a movable fixture, moving past a medium to be scanned, or the medium is pulled past the image sensor by motor-operated rolls. Thereby a complete scanned image of the physical medium can be generated. The scanned image is influenced by the intensity and spectrum of the light source and the sensitivity of the image sensor. As the intensity and/or spectrum of the light generated by the light source and/or the sensitivity of the image sensor changes over time, images with faulty colour balances and/or intensity values may result.

WO09138255A discloses a device for optical scanning, comprising: a plurality of image sensor elements, where the image sensor elements are arranged to detect light incident on the image sensor elements, emitted from a light source and reflected from an object subject to optical scanning; wherein the amount of light received at least one of the image sensor elements is to a larger extent light transmitted from the light source; and to a smaller extent light reflected from the object. Thereby some variations in the light generated by the light source may be accounted for. Further studies have, however, discovered the need for an improved method of compensating for light variations.

Thus, it remains a problem to provide a more effective method for compensating for light variations of light sources in optical scanners.

SUMMARY

According to a first aspect, there is provided a method of scanning a physical medium by an image scanner comprising a first image sensor having a plurality of image sensor elements that provide an image signal recorded at a first area of the physical medium, and a first light source associated with said first image sensor, said method comprising guiding light emitted from said first light source towards a first group of image sensor element(s) positioned in a first end of said first image sensor, recording a first light calibration value using said first group of image sensor element(s) indicative of a light intensity, at the first end of the first image sensor, of the light generated by the first light source;

wherein the method further comprises repeating the above step by using a second group of image sensor element(s) positioned in a second end of said first image sensor, thus resulting in a second light calibration value indicative of a light intensity, at the second end of the first image sensor, of the light generated by the first light source; and generating a first compensation signal for image sensor elements positioned between said first and said second group of image sensor element(s) by processing said first and said second light calibration value together;

compensating said image signals provided by said first image sensor using said first compensation signal.

Consequently, an improved method of compensating for light variations of light sources in optical scanners and variations in image sensor sensitivity is provided. By recording two light calibration values, one at each end of the image sensors, a compensation signal may be generated which is capable of compensating for spatial variations in the light generated by the light source.

The image sensor may comprise image sensor elements arranged in an array, e.g. a linear array. The image sensor may comprise two staggered linear arrays of image sensor elements, e.g. two 600 dpi arrays staggered to create a 1200 dpi image sensor. Any kind of image sensors suitable for optical scanning may be used, such as any kind of photo voltaic sensor e.g. a contact image sensor (CIS) or a charge coupled device (CCD) camera. The light source may be any light source such as a xenon-based lighting device, a cold cathode fluorescent lamp or a Light emitting diode (LED) lighting device. The image sensors may comprise a plurality of different image sensor elements configured to detect light having different wave lengths; e.g. a first image sensor element may be configured to detect red light, a second image sensor element may be configured to detect green light, and a third image sensor element may be configured to detect blue light. Alternatively or additionally, the lighting source may be configured to illuminate the physical object to be scanned with light having different wave lengths, e.g. the lighting devices may be configured to create red, green, and blue light. The first light source may be associated with the first image sensor by being arranged so that light generated by the first light source illuminates a part of a physical medium to be scanned, resulting in reflected light that can be recorded by the first image sensor, thereby allowing the first image sensor to form a scanned image of a part of the physical medium. The first light source may be arranged together with a light guide that guides and spreads the light generated by the light source over a part of a physical medium to be scanned e.g. the light source may be a LED emitting light into a light guide, that guides and spreads the light over a part of a physical medium to be scanned.

The physical medium may be any medium suitable for an optical scanner e.g. a piece of paper a page in a book, a map, a drawing, etc.

In some embodiments, the different steps of the method are performed simultaneously e.g. light may be guided towards the first and the second group of image sensor elements at the same time as the physical medium is being scanned e.g. at the same time as the image sensor records image signals of the physical medium.

This will allow line by line compensation for variations in the light generated by the light source, e.g. a compensation signal may be generated for each image line recorded by the image sensor of the physical medium. Consequently, fast temporal variations in the light generated by the light source may be compensated for.

In some embodiments, the different steps of the method are performed at different points in time, e.g. light may be guided towards the first and the second group of image sensor elements before the physical medium is being scanned e.g. as part of a start up calibration of the scanner.

The first and the second light calibration value may be processed together by any algorithm taking the first and the second light calibration value as an input and providing a compensation signal as an output.

Light may be guided from the first light source towards the first group of image sensor element(s) using any suitable means ensuring that the light reaching the first group of image sensor element(s) represents the light emitted towards a part of the physical medium in proximity of the first group of image sensors e.g. by having the same intensity and/or spectral distribution. Correspondingly, light may be guided from the first light source towards the second group of image sensor element(s) using any suitable means ensuring that the light reaching the second group of image sensor element(s) represents the light emitted towards a part of the physical medium in proximity of the second group of image sensor element(s) e.g. by having the same intensity and/or spectral distribution.

The first and the second group of image sensor elements may each comprise any number of image sensor elements e.g. at least 1, 2, 4, 5, 10, 50, 500 or more image sensor elements and/or no more than 1, 2, 4, 5, 10, 50, 500 image sensor elements. The first light calibration value may be an average of the intensity values recorded by the image sensor elements) of the first group of image sensor element(s). Correspondingly, the second light calibration value may be an average of the intensity values recorded by the image sensor element(s) of the second group of image sensor element(s).

The first compensation signal may be a signal comprising a compensation value for some or all of the image sensor elements, e.g. if the first image sensor comprises 5000 image sensor elements between the first and the second group of image sensor elements, the compensation signal, may comprise 5000 compensation values. The method may compensate the image signals by multiplying the compensation signal with the image signals and/or subtracting/adding the compensation signal from/with the image signal. A compensation signal may be generated for each scanned line, and applied to the image data of that line.

When colour images are scanned, individual compensation signals may be generated for a plurality of colour channels e.g. one compensation signal for each of the red, the green, and the blue channel. The method may perform the above described steps, for each colour e.g. by first guiding light having a first colour towards the first and second group of image sensor elements, measuring light calibration values, and generating a compensation signal for the first colour, then guiding light having a second colour towards the first and second group of image sensor elements, measuring light calibration values, and generating a compensation signal for the second colour. Alternatively, if the image sensor comprises image sensor elements configured to detect light having a different wavelength, a plurality of compensation signals may be generated in parallel.

In some situations an even better image quality is needed than can be achieved by the method disclosed above.

In some embodiments, the first compensation signal comprises a first part having an average slope that is larger than the average slope of a second part of the first compensation signal.

Consequently, complex spatial variations in the light generated by the light source can be compensated for. This will allow scanned images with an improved image quality to be formed.

The first compensation signal is a function of image sensor elements, e.g. it is a discrete signal having a value for each image sensor element between the first and the second group of image sensor elements. When the first compensation signal is a discrete signal, the first part may have a length between 2 and N−2, where N is the number of image sensor elements between the first and the second group of image sensor elements. Correspondingly, the second part may have a length between 2 and N−2. The average slope of the first and the second part is defined by the following equation:

$$\bar{a} = \left| \frac{f(b) - f(a)}{b - a} \right|$$

Where $\bar{\alpha}$ is the average slope, and the part starts at element a and ends at element b, f(b) is the compensation value at element b, and f(a) is compensation value at element a. Please note that the absolute value is applied so that the average slope is always positive. The averages slope of the first part of the first compensation signal may be at least 10%, 20%, 50%, 100% or 500% larger than the average slope of the second part.

In some embodiments, the first part of the first compensation signal constitutes at least 5%, 10%, 20%, 25%, 30%, 50%, or 70% of the compensation signal, and the second part of the first compensation signal constitutes at least 30%, 50%, 60%, 70% 75%, 80% or 90% of the first compensation signal.

In some embodiments, each value of the first compensation signal is a weighted average of the first and the second light calibration value.

The weight for a particular value of the first compensation signal may be unaffected by the value of the first and the second light calibration value. The weight for a particular value of the first compensation signal may be influenced by the distance from the image sensor element that is compensated with the particular value, to the first and the second group of image sensor elements, e.g. an image sensor element positioned in proximity of the first group of image sensor elements may be compensated with a compensation value influenced to a larger degree by the first light calibration value than the second light calibration value.

The first and the second light calibration value may be a value centred around 1, so that a value below 1 indicates that less light than expected is emitted towards a physical medium to be scanned and a value above 1 indicates that more light than expected is emitted towards a physical medium to be scanned.

When the first light source comprises a lighting device and a light guide e.g. an LED and a light guide, it has been observed that not only does the light intensity of the LED vary, but also the ability of the light guide to spread and distribute light. However, studies have shown that the relative spatial distribution of light from the light guide is approximately constant. So by measuring two light calibration values, and creating a compensation signal comprising compensation values for the image sensor elements having a fixed weighted average of the first and the second light calibration value, a simple and effective method of compensating for light variation is provided.

For some applications it may be desirable to obtain a more precise estimate of the variations of the light intensity of the light generated by the first light source.

In some embodiments, a third group of image sensor element(s) is used to record a baseline calibration value, said third group of image sensor element(s) being shielded from light and wherein the step of generating a first compensation signal comprises processing the first calibration value, the second calibration value and the baseline calibration value together.

Consequently, by measuring the baseline calibration value a more precise estimation of the light intensity of the light generated by the first light source can be made. This will allow more precise compensation signals to be generated.

The third group of image sensor element(s) may be positioned in proximity of the first or the second group of image sensor element(s). The third group of image sensor elements may comprise any number of image sensor element(s) e.g. at least 1, 2, 4, 5, 10, 50, 500 or more image sensor elements and/or no more than 1, 2, 4, 5, 10, 50, 500 image sensor elements. The third group of image sensor element(s) may be shielded from light by a shielding structure configured to shield a group of image sensor elements from light. The shielding structure may be a black low reflective surface positioned on top of the image sensor element(s) of the third group of image sensor element(s) e.g. a plate of plastic or metal having a low reflective surface e.g. by being painted with a black paint. The shielding structure may be non-transparent. Thereby light from the first light source and/or any other light sources may be blocked for the image sensor element(s) of the third group. This will allow the image sensor element(s) of the third group to measure a baseline value, e.g. a value that will be recorded if a perfect black document is scanned. The baseline calibration value may be an average of the intensity values recorded by the image sensor element(s) of the third group of image sensor element(s).

In some embodiments, light is guided towards said first group of image sensor element(s) using a first light calibration unit, and light is guided towards said second group of image sensor element(s) using a second light calibration unit.

The first and the second light calibration unit may be any unit capable of guiding light from the first light source towards the first and the second group of image sensor elements, respectively. The first and/or the second light calibration unit may be arranged in a fixed spatial relationship with the first image sensor, e.g. the first and/or the second light calibration unit may be attached to the first image sensor or being attached to a glass plate arranged above or below the first image sensor.

In some embodiments, the light calibration unit is a structure having a surface facing towards the first light source, enabling light emitted from the first light source to be reflected towards the image sensor element(s) of the first and/or second group of image sensor elements without being reflected by the object to be scanned. The surface may be a highly reflective surface e.g. having a white colour.

In some embodiments, the light calibration unit comprises means for shielding the first and the second group of image sensor element(s) from light reflected and/or refracted by a physical object to be scanned.

The means for shielding the first and the second group of image sensor element(s) may be a non-transparent surface facing the physical medium to be scanned, preventing light, reflected and/or refracted from the physical medium, to reach the first and the second group of image sensor element(s).

In some embodiments, the light calibration unit is a unit having a group of mirrors arranged so that a light ray emitted from the first light source is guided towards the first and/or the second group of image sensor elements.

In some embodiments, the light calibration unit is a unit comprising a light guide, arranged so that light emitted from the first light source is guided towards the first and/or second group of image sensor elements.

In some embodiments, said first light calibration unit is attached to said first end of said image sensor, and said second light calibration unit is attached to said second end of said image sensor.

In some embodiments, the image scanner further comprises a second image sensor comprising a plurality of image sensor elements that provide an image signal recorded at a second area of the physical medium, where a portion of the second area is recorded also by the first image sensors, whereby image data from overlapping and non-overlapping areas are present in the respective image signals, and a second light source associated with said second image sensor, said method further comprising, guiding light emitted from said second light source towards a fourth group of image sensor element(s) positioned in a first end of said second image sensor, recording a third light calibration value using said fourth group of image sensor element(s) indicative of a light intensity, at the first end of the second image sensor, of the light generated by the second light source;

guiding light emitted from said second light source towards a fifth group of image sensor element(s) positioned in a second end of said second image sensor, recording a fourth light calibration value using said fifth group of image sensor element(s) indicative of a light intensity, at the second end of the second image sensor, of the light generated by the second light source;

generating a second compensation signal for image sensor elements positioned between said fourth and said fifth group of image sensor element(s) of said second image sensor by processing said third and said fourth light calibration value together;

compensating said image signals provided by said second image sensor using said second compensation signal.

The image sensors may be arranged in any fashion as long as a common area of a scanned medium is recorded by at least two image sensors. The image sensors may be arranged on a movable structure, and/or a physical medium may be moved past the image sensors so that a completely scanned image of the physical medium may be formed. The common area may be recorded by the image sensors at different points in time; e.g. the image sensors may be arranged on two parallel lines, where every other image sensor is arranged with a field of view on a first line, and the image sensors in-between are arranged with a field of view on a second line, where the distance between the field of view of two adjacent image sensors on a line is below the width of the field of view of the image sensors, such that an area of a scanned medium recorded by an image sensor on the first line is also recorded by an image sensor on the second line, at a different point in time; e.g. when the image sensors and/or the physical medium are/is moved, as described in relation to FIG. 4.

The first and the second image sensor may be structurally equal. All devices, methods or processing signals, and methods of scanning described in relation to the first image sensor may equally be applied to the second image sensor.

According to a second aspect, there is provided an apparatus for scanning comprising a first image sensor having a plurality of image sensor elements that provide an image signal recorded at a first area of a physical medium, a first light source associated with said first image sensor, a first light calibration unit configured to guide light from said first light source towards a first group of image sensor element(s) positioned in a first end of said first image sensor, a second light calibration unit configured to guide light from said first light source towards a second group of image sensor element(s) positioned in a second end of said first image sensor, and a processing unit for generating a first compensation signal for image sensor elements positioned between said first and said second group of image sensor element(s) by processing a first light calibration value recorded by the first group of image sensor element(s) together with a second light calibration value recorded by the second group of image sensor element(s).

All components of the apparatus may be integrated in a single integral unit, e.g. in an optical scanner, or the different parts of the apparatus may be implemented in different components; e.g. the image sensors may be implemented in a first component and the processing unit may be implemented a second component, e.g. in a PC connected to the first component with data communication means or in a server connected to the internet communicating directly or indirectly with the first component using data communication means.

According to a third aspect, there is provided a method of processing signals from a first image sensor having a plurality of image sensor elements that provide an image signal recorded at a first area of a physical medium, said method comprising obtaining a first light calibration value, indicative of a light intensity, at the first end of the first image sensor of light generated by a first light source associated with said first image sensor, Wherein the method further comprises repeating the above step by obtaining a second light calibration value indicative of a light intensity, at the second end of the first image sensor, of the light generated by the first light source; and generating a first compensation signal for image sensor elements positioned between said first and said second group of image sensor element(s) by processing said first and said second light calibration value together.

According to a fourth aspect, there is provided a method of scanning a physical medium by an image scanner comprising a first image sensor having a plurality of image sensor elements that provide an image signal recorded at a first area of a physical medium, a first light source associated with said first image sensor, and a first shielding structure associated with said first image sensor shielding a third group of image sensor elements from direct and reflected light from the first light source and any other light sources, said method comprising, recording a first baseline calibration value with said third group of image sensor element(s);
generating a first compensation signal for image sensor elements of said first image sensor by processing said first baseline calibration value;
compensating said image signals provided by said first image sensor using said first compensation signal.

In some embodiments, the image scanner further comprises a second image sensor comprising a plurality of image sensor elements that provide an image signal recorded at a second area of the physical medium, where a portion of the second area is recorded also by the first image sensors, whereby image data from overlapping and non-overlapping areas are present in the respective image signals, a second light source associated with said second image sensor, and a second shielding structure associated with said second image sensor shielding a sixth group of image sensor elements from direct and reflected light from the second light source and any other light sources, and said method further comprising recording a second baseline calibration value with said sixth group of image sensor element(s);
generating a second compensation signal for image sensor elements of said second image sensor by processing said second baseline calibration value;
compensating said image signals provided by said second image sensor using said second compensation signal.

Here and in the following, the terms 'processing means' and 'processing unit' are intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special-purpose electronic circuits, etc., or a combination thereof.

The different aspects of the present invention can be implemented in different ways including methods of scanning a physical medium, the methods of processing signals, and apparatuses described above and in the following, each yielding one or more of the benefits and advantages described in connection with at least one of the aspects described above, and each having one or more preferred embodiments corresponding to the preferred embodiments described in connection with at least one of the aspects described above and/or disclosed in the dependent claims. Furthermore, it will be appreciated that embodiments described in connection with one of the aspects described herein may equally be applied to the other aspects.

BRIEF DESCRIPTION OF THE DRAWINGS

The above and/or additional objects, features and advantages of the present invention will be further elucidated by the following illustrative and non-limiting detailed description of embodiments of the present invention, with reference to the appended drawings, wherein.

DETAILED DESCRIPTION

In the following description, reference is made to the accompanying figures, which show, by way of illustration, how the invention may be practiced.

Figure 1A:
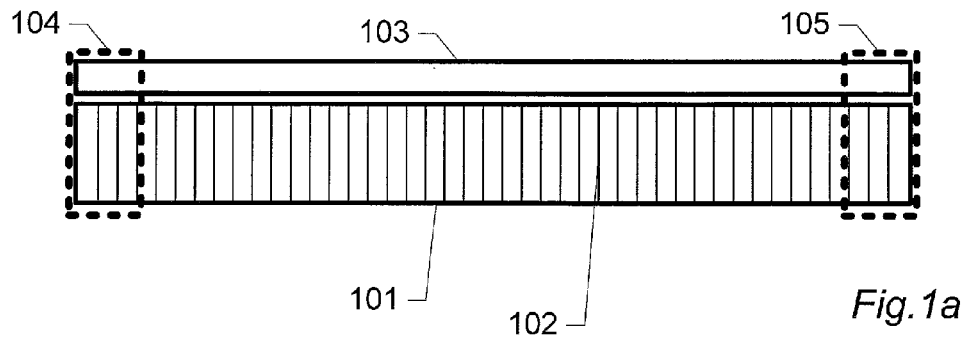
FIG. 1a shows an image sensor according to an embodiment of the present invention.

FIG. 1a shows a schematic drawing of an image sensor 101 and a light source 103 according to an embodiment of the present invention. The image sensor comprises a plurality of image sensor elements 102 arranged in a linear array. The image sensor may be a CIS image sensor or a CCD image sensor. Shown is a first group of image sensor elements 104 arranged in a first end of the image sensor 101 and a second group of image sensor elements 105 arranged in a second end of the image sensor 101. The light source 103 is associated with the first image sensor 101 by being arranged so that light is emitted from the light source 103 towards a physical object to be scanned and reflected by the physical object towards the image sensor 101. This allows the image sensor 101 to generate an image of the physical object. By using suitable means e.g. as described above or below, light is guided from the first light source 103 towards the first and the second group of image sensor element(s) 104 105. This allows the first and the second group of image sensor element(s) 104 105 to record light calibration values indicative of the intensity of the first light source 103 at the first and the second end of the image sensor 101 respectively.

Figure 1B:
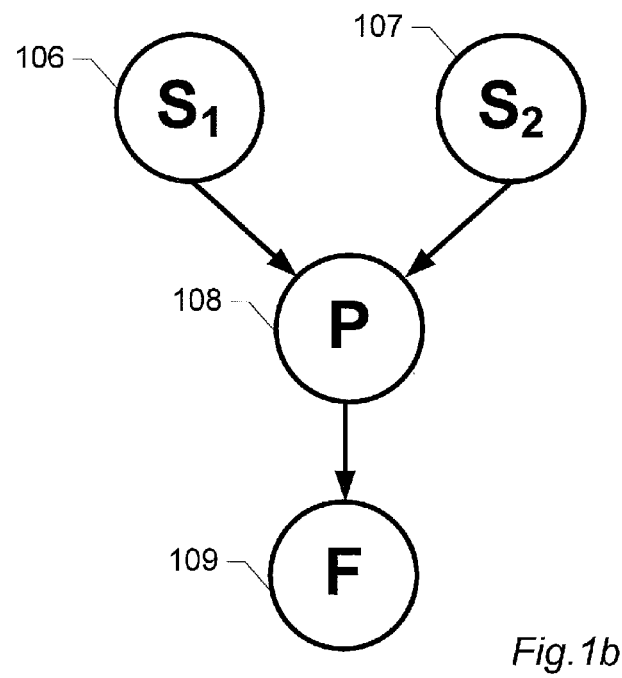
FIG. 1b shows a method of scanning a physical object according to an embodiment of the present invention.

FIG. 1b shows a method of generating a compensation signal for image data recorded by the image sensor 101 shown in FIG. 1a, according to an embodiment of the present invention. A first light calibration value 106 recorded by the first group of image sensor elements 104 and a second light calibration value 107 recorded by the second group of image sensor elements 105 are processed together 108 to create a compensation signal 109. The compensation signal is a function of image sensor elements, e.g. a compensation value for each of the image sensor elements of the image sensor 101 between the first and the second group of image sensor elements 104 105 may be created.

Figure 2A:
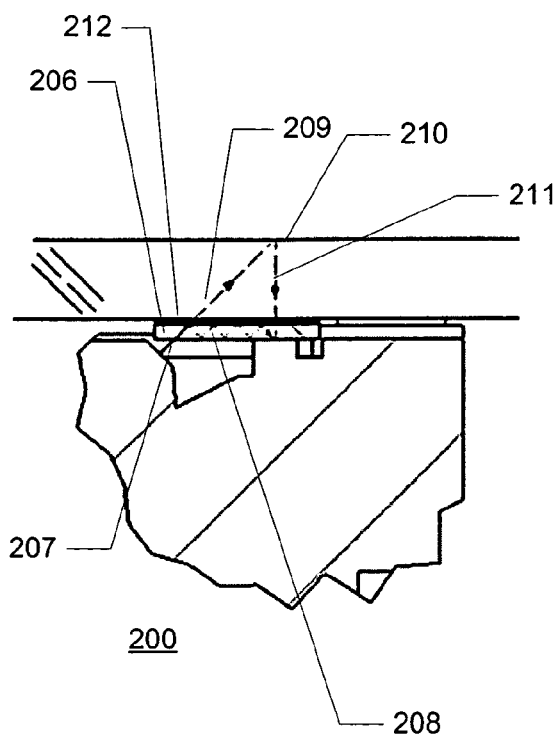
FIG. 2a-e show examples of light calibration units according to some embodiments of the present invention.

FIG. 2a shows the function of a light calibration unit 206 of an image sensor 200 according to an embodiment of the invention. Light 207 from the light source may be transmitted or reflected as light waves 208 by a light calibration unit 206. Transmission or reflection may e.g. take place by means of a cover or coating 212 on the light calibration unit 206, and light waves may be directed to corresponding image sensor elements, whereby the light intensity of the light source may be measured. This light ray path may be defined as a modified light ray path in relation to the normal scanning light ray path of an image sensor, which is used for scanning the document. This scanning light ray path can be seen as the light 209 from the light source, which is reflected or refracted at the glass plate 210 where the object to be scanned is placed. The light 211 reflected or refracted from the document is gathered by the array of image sensor elements for recording an image of the scanned object.

The light calibration unit 206 may reflect, refract, transmit and/or guide light waves 208 from or through it, and the light calibration unit 206 may be constructed in any suitable way for preventing that a portion of light is sent to the object to be scanned, and to ensure that this portion of light is sent to the first and/or the second group of image sensor element(s).

Figure 2B:
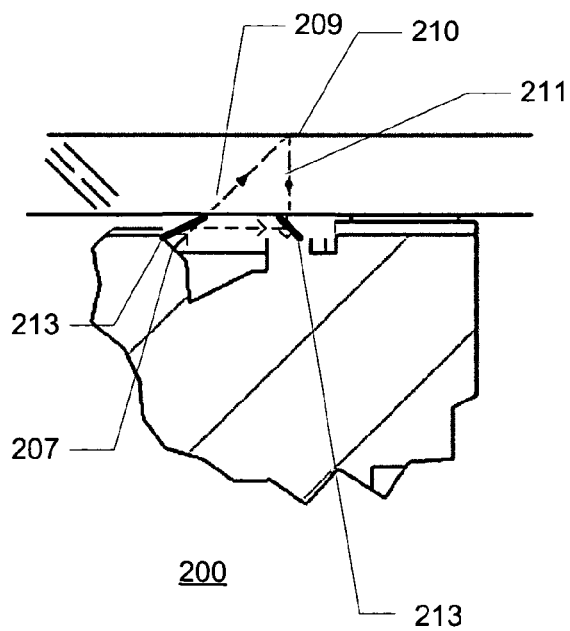
Figure 2C:
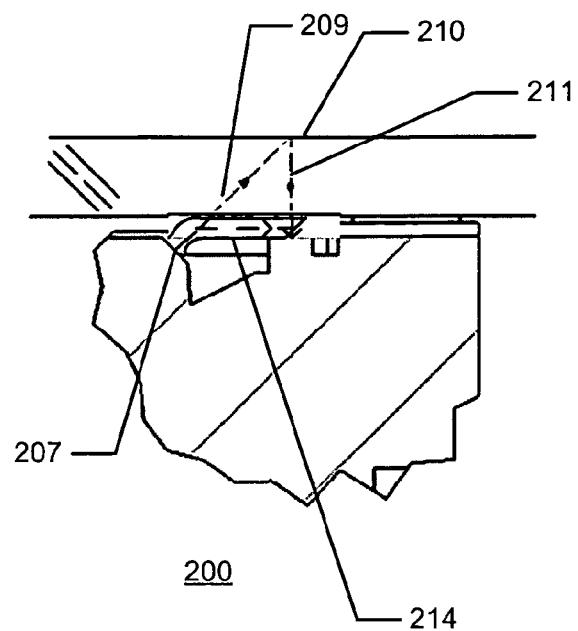
Figure 2D:
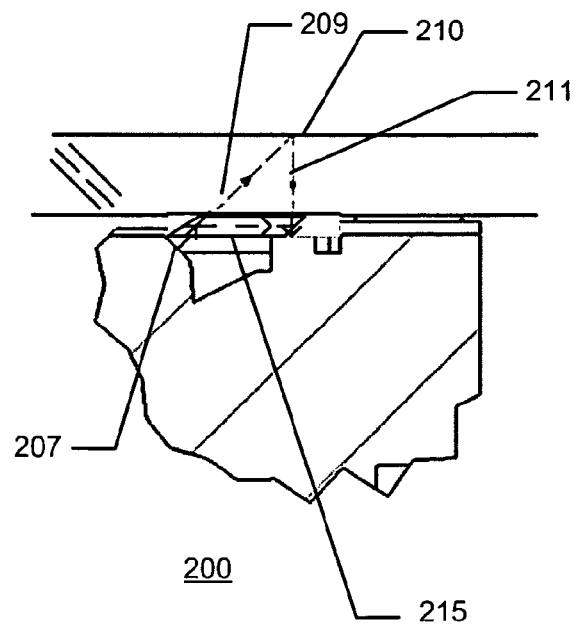
Figure 2E:
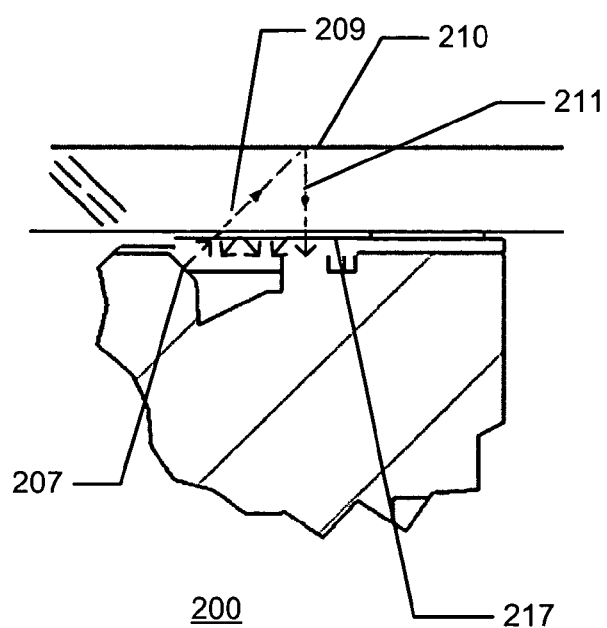

Alternatively or additionally, other suitable means than a light calibration unit 206 as described in relation to FIG. 2a may be provided for transmitting, reflecting and/or refracting light from the light source to the first and the second group of image sensor element(s), and for shielding the first and the second group of image sensor element(s) from light reflected and/or refracted from the object subject to scanning. These other suitable means may comprise:

- one or more units comprising at least partially opaque white plastic, which may provide light reflection;
- one or more units transmitting light by means of a reflector, where a reflector may result in reflection of a wave front, such as a light wave. FIG. 2b shows reflectors 213.
- the reflector can be a mirror which may result in reflection of light;
- the reflector can be a reflective foil which may result in reflection of light;
- the reflector can be metallised plastic which may result in reflection of light;
- one or more units comprising a light guide, a light pipe, a light tube or the like, which may result in transportation of light. FIG. 2c-d shows a light guide 214.
- the light guide can be a prism light guide, which may result in reflection or refraction of light. FIG. 2d shows a prism light guide 215.
- the reflector may provide specular reflection and/or diffuse reflection, reflected light can be provided by a silk-screen printed white patch of the unit. FIG. 2e shows a silk-screen printed white patch 217.
- the diffuse, reflected light can be provided by a matte end face of the unit.

Figure 3:
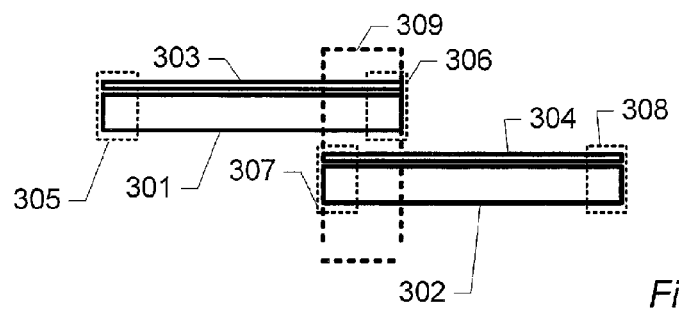
FIG. 3 shows two image sensors arranged with an overlapping area according to an embodiment of the present invention.

FIG. 3 shows a first and a second image sensor 301 302 arranged with an overlapping area 309 according to an embodiment of the present invention. The image sensors 301 302 may be CIS image sensors. The image sensors 301 302 may be arranged on a movable member, moving the image sensors past a medium to be scanned, and/or the medium may be moved past the image sensors using suitable means, e.g. motor operated rolls pulling the physical medium past the image sensors, such that a complete image of the physical medium can be generated. A first light source 303 is associated with the first image sensor by being arranged to emit light towards a physical medium to be scanned, so that the light reflected and/or refracted by a physical medium will reach the first image sensor 301 allowing the first image sensor 301 to form an image of a part of the physical medium. A second light source 304 is associated with the second image sensor 302 by being arranged to emit light towards a physical medium to be scanned, so that the light reflected and/or refracted by a physical medium will reach the second image sensor 302 allowing the second image sensor 302 to form an image of a part of the physical medium. The image sensors 301 302 are arranged such that a portion of the area recorded of a scanned medium by one image sensor is also recorded by another image sensor; e.g. the region 309 is recorded by both the first and the second image sensor 301 302 just at another point in time; e.g. when the image sensors or the medium has been moved. Alternatively, if the image sensors are CCD cameras, the image sensors may be arranged on a single line recording the same area of a scanned medium at the same time. By combining the images recorded by the image sensors 301 302 a full image of a physical medium may be formed.

The first image sensor comprises a first and a second group of image sensor element(s) 305 306 positioned in a first and a second end for the first image sensor 301. The first and the second group of image sensor element(s) 305 306 are used to record a first and a second light calibration value respectively. Light may be guided from the first light source 303 towards the first and the second group of image sensor element(s) 305

306 using two light calibration units as discussed above e.g. in relation to FIG. 2a-e. Correspondingly, the second image sensor 302 comprises a fourth and a fifth group of image sensor element(s) 307 308 positioned in a first and a second end for the second image sensor 302. The fourth and the fifth group of image sensor element(s) 307 308 are used to record a third and a fourth light calibration value respectively. Light may be guided from the second light source 304 towards the fourth and the fifth group of image sensor element(s) 307 308 using two light calibration units as discussed above e.g. in relation to FIG. 2a-e. A calibration signal may be generated for each of the first and the second image sensor 301 302 using the principles discussed above or below e.g. in relation to FIG. 1a-b.

Figure 4:
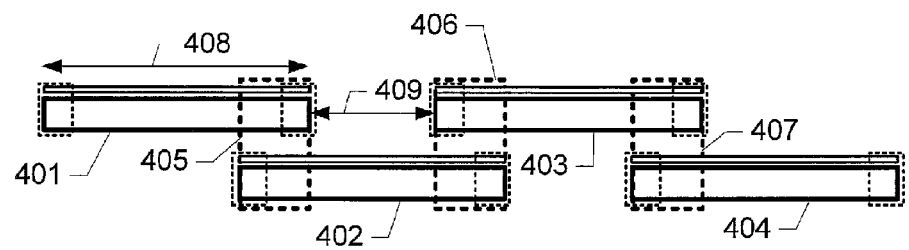
FIG. 4 shows four image sensors arranged with overlapping areas according to an embodiment of the present invention.

FIG. 4 shows four image sensors 401 402 403 404 arranged with overlapping areas 405 406 407 according to an embodiment of the present invention. The image sensors 401 402 403 404 may be CIS image sensors. The image sensors 401 402 403 404 may be arranged on a movable member, moving the image sensors past a medium to be scanned, and/or the medium may be moved past the image sensors using suitable means, e.g. motor-operated rolls pulling the physical medium past the image sensors, such that a complete image of the physical medium can be generated. The image sensors are arranged on two parallel lines, where every other image sensor 401 403 are arranged with a field of view on a first line and the image sensors in-between 402 404 are arranged with a field of view on a second line, where the distance between the field of view of two adjacent image sensors on a line 409 is below the width of the field of view of the image sensors 408, such that an area of a scanned medium recorded by an image sensor on the first line is also recorded by an image sensor on the second line 405 406 407, at a different point in time; e.g. when the image sensors and/or the physical medium have/has been moved. Each image sensor 401 402 403 404 comprises two groups of image sensor element(s) used to record to light calibration values for each image sensor.

Each image sensor has a light source associated. The light source is arranged to emit light towards a physical medium to be scanned, so that the light reflected and/or refracted by a physical medium will reach the image sensor they are associated with allowing the image sensor to form an image of a part of the physical medium. By combining the images recorded by the image sensors 401 402 403 404 a full image of a physical medium may be formed.

Figure 5A:
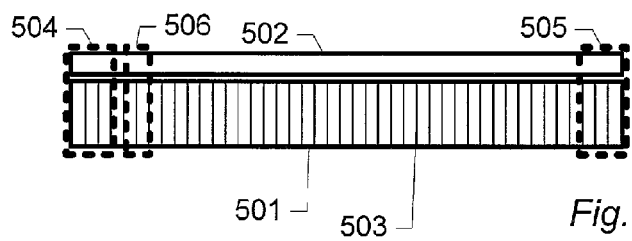
FIG. 5a shows an image sensor according to an embodiment of the present invention.

FIG. 5a shows a schematic drawing of an image sensor 501 having a light source 502 associated, according to an embodiment of the present invention. The image sensor 501 comprises a plurality of image sensor elements 503 arranged in a linear array. The image sensor may be a CIS image sensor or a CCD image sensor. Shown is a first group of image sensor elements 504 arranged in a first end of the image sensor 501, a second group of image sensor elements 505 arranged in a second end of the image sensor 501, and a third group of image sensor elements 506 arranged adjacent to the first group of image sensor elements 504. The light source 502 is arranged so that light is emitted from the light source 502 towards a physical object to be scanned, and reflected by the physical object to be scanned towards the image sensor 501. This allows the image sensor 501 to generate an image of the physical object. By using suitable means e.g. as described above or below, light is guided from the first light source 502 towards the first and the second group of image sensor element(s) 504 505, respectively. This allows the first and the second group of image sensor element(s) 504 505 to record light calibration values indicative of the intensity of the first light source 502 at the first and the second end of the image sensor 501 respectively. By using suitable means as described above or below the image sensor element(s) of the third group 506 is/are blocked from substantially any light. This may be achieved by positioning a non transparent surface in close proximity of the image sensor element(s) of the third group 506 e.g. on top of the image sensor element(s) of the third group 506.

Figure 5B:
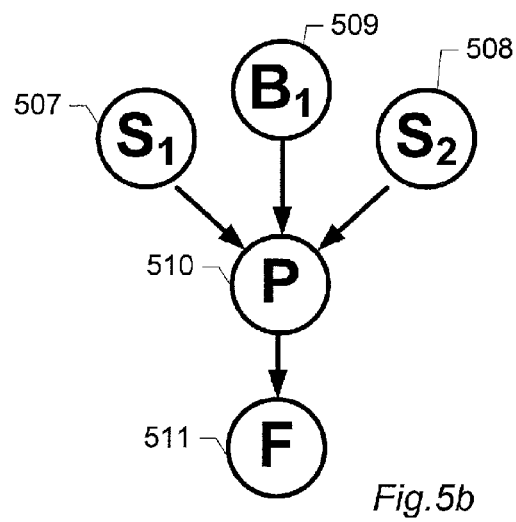
FIG. 5b shows a method of scanning a physical object according to an embodiment of the present invention

FIG. 5b shows a method of generating a compensation signal for image data recorded by the image sensor 501 shown in FIG. 5a according to an embodiment of the present invention. A first light calibration value 507 recorded by the first group of image sensor elements 504, a first baseline calibration value recorded by the third group of image sensor elements 506 and a second light calibration value 508 recorded by the second group of image sensor elements 505 are processed together 510 to create a compensation signal 511. The compensation signal is a function of image sensor elements, e.g. a compensation value for each of the image sensor elements of the image sensor 501 between the third and the second group of image sensor elements 506 505 may be created.

Figure 6:
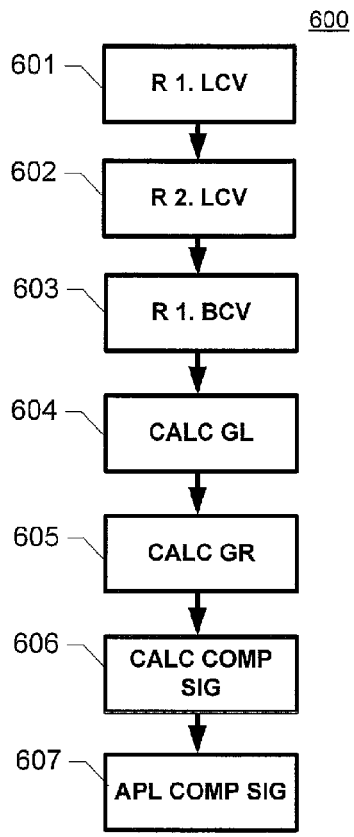
FIG. 6 shows a flow chart of a method of scanning according to an embodiment of the present invention.

FIG. 6 shows a flowchart of a method for scanning a physical medium according to an embodiment of the present invention. First, in step 601 light is guided towards a first group of image sensor elements positioned in a first end of an image sensor. Using the first group of image sensor element(s), a first light calibration value is recorded. The first light calibration value may be an average of the light intensity measured by the element(s) in the first group of image sensor element(s). Then, in step 602, light is guided towards a second group of image sensor elements positioned in a second end of an image sensor. Using the second group of image sensor element(s), a second light calibration value is recorded. The second light calibration value may be an average of the light intensity measured by the element(s) in the second group of image sensor element(s). In step 603, a first baseline calibration value is recorded by a third group of image sensor elements by blocking the third group of image sensor elements from light. The first baseline calibration value may be an average of the light intensity measured by the element(s) in the third group of image sensor element(s). Next, in step 604, a first gain value for the first end of the image sensor is calculated, by processing the first light calibration value and the first baseline calibration value together. The first gain value may be determined by the following equation:

$$G_1 = \frac{I_{1ref} - I_{bref}}{I_1 - I_b}$$

Where $G_1$ is the first gain value, $I_{1\,ref}$ is a reference value for the first light calibration value, $I_{b\,ref}$ is a reference value for the first baseline calibration value, $I_1$ is the first light calibration value, and $I_b$ is the first baseline calibration value. The reference values may be measured in the production and/or development phase of the image scanner and/or during subsequent calibration processes. The reference values indicate the values that are expected and/or desired. A first gain value above 1 indicates that the light source emits less light than expected at the first end of the image sensor, and, correspondingly, a first gain value below 1 indicates that the light source emits more light than expected at the first end of the image sensor. In step 605, a second gain value for the second end of the image sensor is calculated by processing the second light calibration value and the first baseline calibration value together. The second gain value may be determined by the following equation:

$$G_2 = \frac{I_{2ref} - I_{bref}}{I_2 - I_b}$$

Where $G_2$ is the second gain value, $I_{2\,ref}$ is a reference value for the second light calibration value, $I_{b\,ref}$ is a reference value for the first baseline calibration value, $I_2$ is the second light calibration value, and $I_b$ is the first baseline calibration value. The reference values may be measured in the production and/or development phase of the image scanner and/or during subsequent calibration processes. The reference values indicating the values that are expected and/or desired. A second gain value above 1 indicates that the light source emits less light than expected at the second end of the image sensor, and, correspondingly, a second gain value below 1 indicates that the light source emits more light than expected at the second end of the image sensor. In step 606, a first compensation signal is generated by processing the first and the second gain value together. The first compensation signal may comprise a compensation value for each of the image sensor elements positioned between the first and the second group of image sensor element(s) or between the third and the first or the second group of image sensor elements. Each value in the compensation signal may be a weighted average between the first and the second gain value. The first compensation signal may comprise a first part having an average slope that is larger than the average slope of a second part of the first compensation signal. This has shown to yield a better result as light sources may generate light having complex spatial variations. Finally, in step 607, the generated first compensation signal is applied to image signals recorded by the image sensor. The image signal may be a scanned line of a physical medium, so that each value in the image signal corresponds to an intensity value recorded by an image sensor element. The compensation signal may be applied to the image signal by first subtracting the baseline calibration value from the image signal and then multiplying each value of the image signal with the correct value in the compensation signal as specified by the following equation:

$$S_{comp}(e) = (s(e) - I_b) \cdot F(e)$$

where $S_{comp}(e)$ is the compensated image signal, $s(e)$ is the uncompensated image signal, $I_b$ is the first baseline calibration value, $F(e)$ is the first compensation signal, and $e$ is a particular image sensor element. Please note that the compensated image signal, the uncompensated image signal, and the first calibration signal all are functions of image sensor elements, e.g. they comprise a particular value for each image sensor element.

Figure 7A:
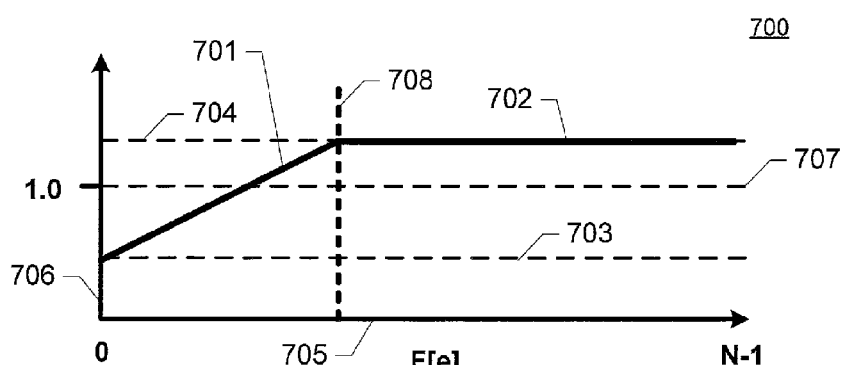
FIG. 7a-f show different compensation signals according to some embodiments of the present invention.

FIG. 7a shows a compensation signal 700 according to an embodiment of the present invention having a first part and a second part, where the average slope of the first part is higher than the average slope of the second part, according to an embodiment of the present invention. The compensation signal 700 is a function of image sensor elements. The compensation signal starts at element 0 which corresponds to the first image sensor element used for imaging, and goes until element N−1 which corresponds to the last image sensor element used for imaging, where N is the number of image sensor elements used for imaging. The compensation signal 700 comprises a first part 701 and a second part 702. The average slope of the first part 701 is higher than the average slope of the second part 702. The values of the compensation signal in this example are centred around the value 1.0, however in other examples the values may be centred around other values. The first part of the signal 700 starts at the first gain value 703 and ends at the second gain value 704. The second part of the signal 702 is constant at the second gain value 704. The first gain value is below 1 which indicates that more light than expected is emitted from the light source at the first end of the image sensor element. Correspondingly the second gain value is above 1 which indicates that less light than expected is emitted from the light source at the second end of the image sensor element. The first part of the compensation signal 701 corresponds approximately to 30% of the total length of the compensation signal 700, and the second part of the compensation signal 702 corresponds approximately to 70% of the total length of the compensation signal 700. FIG. 7b-e show compensation signals according to some embodiments of the present invention, comprising a first part having an average slope that is larger than the average slope of a second part.

Figure 7B:
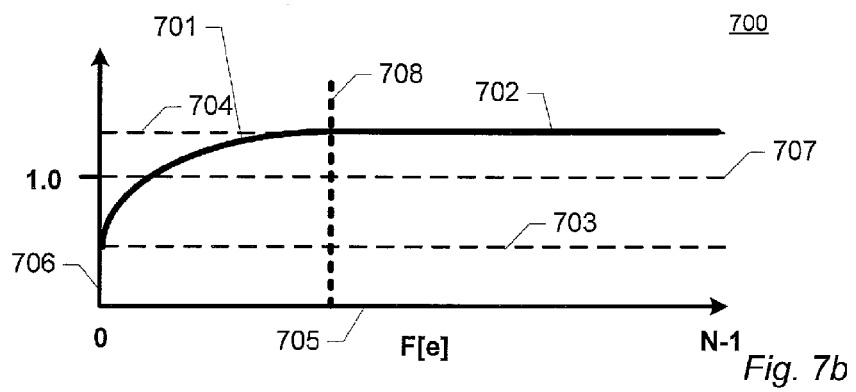

FIG. 7b shows a compensation signal 700, according to an embodiment of the present invention, having a first part 701 having a parabolic shape, and a second part 702 having a flat linear shape. The first part 701 has an average slope that is higher than the average slope of the second part 702. The average slope of the first part 701 in FIG. 7b is the same as the average slope of the first part 701 in FIG. 7.a.

Figure 7C:
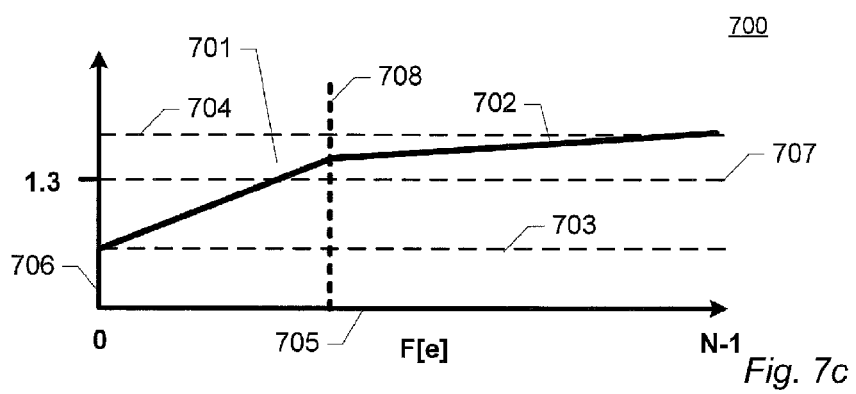

FIG. 7c shows a compensation signal 700 according to an embodiment of the present invention, having a first part 701 and a second part 702 both having a linear shape. The first part 701 has an average slope that is higher than the average slope of the second part 702.

Figure 7D:
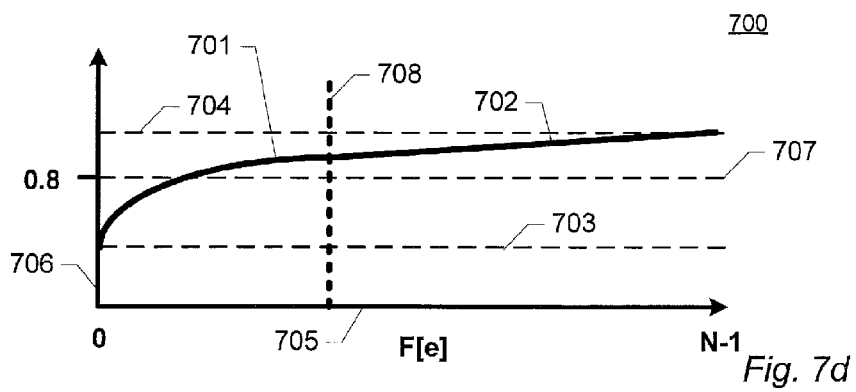

FIG. 7d shows a compensation signal 700 according to an embodiment of the present invention, having a first part 701 having a parabolic shape, and a second part 702 having a linear shape. The first part 701 has an average slope that is higher than the average slope of the second part 702.

Figure 7E:
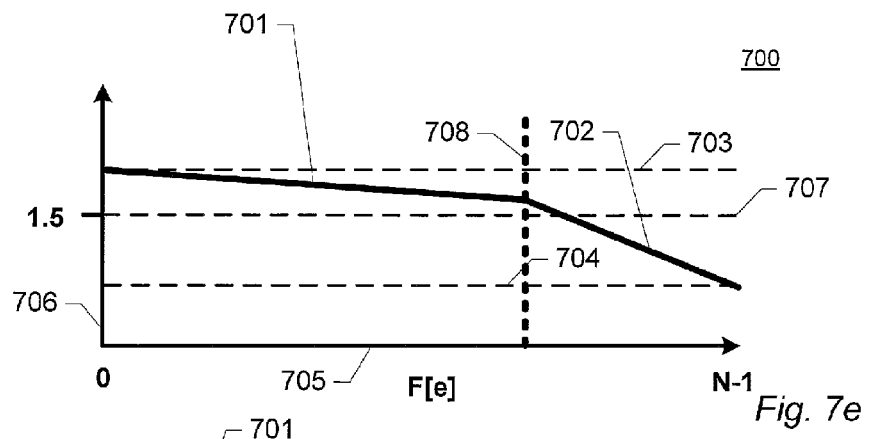

FIG. 7e shows a compensation signal 700 according to an embodiment of the present invention, having a first part 702 and a second part 701 both having a linear shape. The first part 702 has an average slope that is higher than the average slope of the second part 701.

Figure 7F:
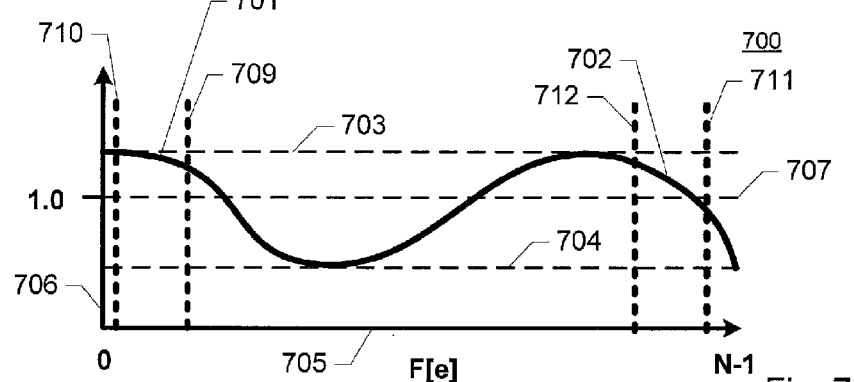

FIG. 7f shows a compensation signal 700 according to an embodiment of the present invention, having a first part 702, between the two vertical lines 712 711, and a second part 701 between the two vertical lines 709 710. The first part 702 has an average slope that is higher than the average slope of the second part 701.

Figure 8:
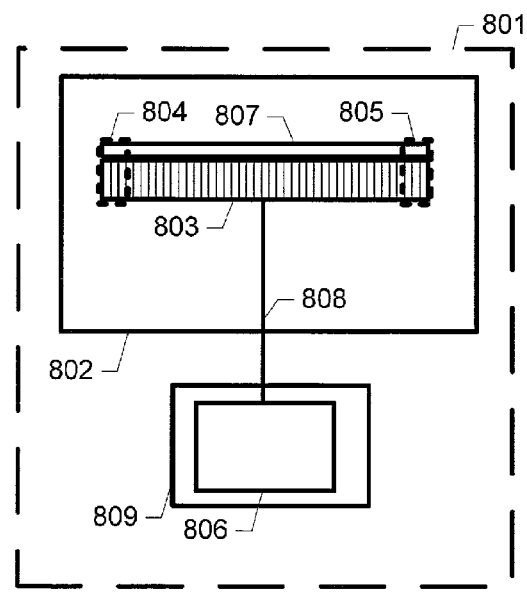
FIG. 8 shows a schematic drawing of an apparatus for scanning according to an embodiment of the present invention.

FIG. 8 shows a schematic drawing of an apparatus for scanning 801 according to an embodiment of the present invention. The apparatus comprises a first image sensor 803, a first light calibration unit 804, a second light calibration unit 805, and a first light source 807. The first light calibration unit 804 is positioned in a first end of the first image sensor 803, and directs light from the first light source 807 towards a first group of image sensor elements, enabling them to record a first light calibration value. The second light calibration unit 805 is positioned in a second end of the first image sensor 803, and directs light from the first light source 807 towards a second group of image sensor elements, enabling them to record a second light calibration value. The apparatus further comprises a processing unit 806 connected to the image sensors by data communication means 808. The processing unit 806 may process the first and second light calibration value using the principles discussed above e.g. in relation to FIG. 1a-b. All components of the apparatus 801 may be integrated in a single integral unit, e.g. in an optical scanner, or the different parts of the apparatus may be implemented in different components; e.g. the image sensor 803, the first light source 807, the first and the second light calibration unit 804 805, may be implemented in a first component 802 and the processing unit 806 may be implemented in a second component 809 e.g. in a personal computer (PC) connected to the first component 802 with data communication means 808 or in a server connected to the internet communicating directly or indirectly with the first component 802 using data communication means 808.

Figure 9A:
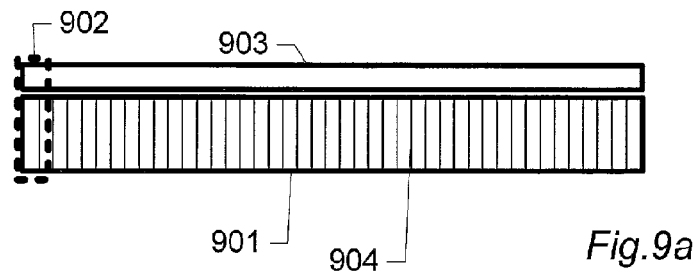
FIG. 9a shows an image sensor according to an embodiment of the present invention.

FIG. 9a shows a schematic drawing of an image sensor 901 and a light source 903 according to an embodiment of the present invention. The image sensor 901 comprises a plurality of image sensor elements 904 arranged in a linear array. The image sensor may be a CIS image sensor or a CCD image sensor. Shown is a third group of image sensor element(s) 902 arranged in a first end of the image sensor 901. The light source 903 is associated with the image sensor 901 by being arranged so that light is emitted from the light source 903 towards a physical object to be scanned, and reflected by the physical object towards the image sensor 901. This allows the image sensor 901 to generate an image of the physical object. By using suitable means e.g. as described above or below, light is prevented from reaching the image sensor element of the third group of image sensor element(s) 902. This allows the third group of image sensor element(s) 902 to record a baseline calibration value indicative of a baseline value for the image sensor e.g. a value the image sensor elements will record if a perfect black document is scanned.

Figure 9B:
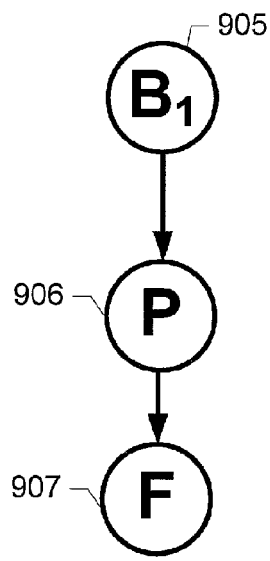
FIG. 9b shows a method of scanning a physical object according to an embodiment of the present invention

FIG. 9b shows a method of generating a compensation signal for image data recorded by the image sensor 901 shown in FIG. 9a according to an embodiment of the present invention. A first baseline calibration value 905 recorded by the third group of image sensor elements 902 is processed 906 to create a compensation signal 907. The compensation signal is a function of image sensor elements, e.g. a compensation value for each of the image sensor elements of the image sensor 901 used for imaging may be created. The processing may be accomplished by generating a flat function having the baseline calibration value for all image sensor elements. Image signal recorded by the image sensor 901 may be compensated by subtracting the compensation signal 907 from the image signals, so zero light intensity corresponds to a value of zero.

Figure 10:
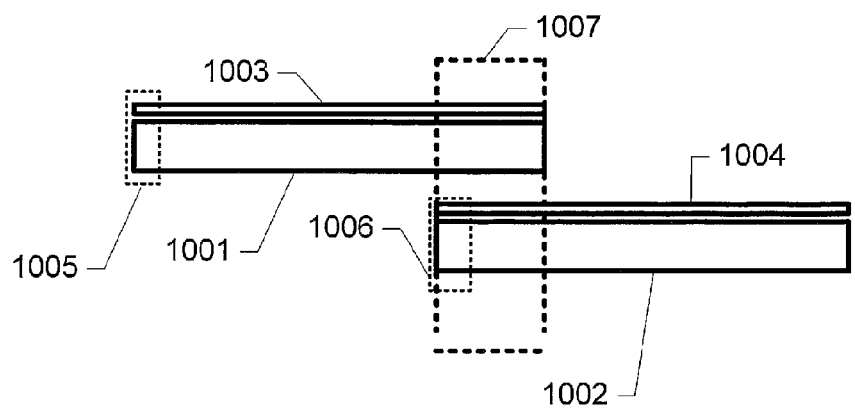
FIG. 10 shows two image sensors arranged with an overlapping area according to an embodiment of the present invention.

FIG. 10 shows a first and a second image sensor 1001 1002 arranged with an overlapping area 1007 according to an embodiment of the present invention. The image sensors 1001 1002 may be CIS image sensors. The image sensors 1001 1002 may be arranged on a movable member, moving the image sensors past a medium to be scanned, and/or the medium may be moved past the image sensors using suitable means, e.g. motor-operated rolls pulling the physical medium past the image sensors, such that a complete image of the physical medium can be generated. A first light source 1003 is associated with the first image sensor by being arranged to emit light towards a physical medium to be scanned, so that the light reflected and/or refracted by a physical medium will reach the first image sensor 1001 allowing the first image sensor 1001 to form an image of a part of the physical medium. A second light source 1004 is associated with the second image sensor 1002 by being arranged to emit light towards a physical medium to be scanned, so that the light reflected and/or refracted by a physical medium will reach the second image sensor 1002 allowing the second image sensor 1002 to form an image of a part of the physical medium. The image sensors 1001 1002 are arranged such that a portion of the area recorded of a scanned medium by one image sensor is also recorded by another image sensor; e.g. the region 1007 is recorded by both the first and the second image sensor 1001 1002 just at another point in time; e.g. when the image sensors or the medium have/has been moved. Alternatively, if the image sensors are CCD cameras, the image sensors may be arranged on a single line recording the same area of a scanned medium at the same time.

The first image sensor comprises a third group of image sensor element(s) 1005 positioned in a first end for the first image sensor 301. The third group of image sensor element(s) 1005 is used to record a first baseline calibration value. Correspondingly, the second image sensor 1002 comprises a sixth group of image sensor element(s) 1006 positioned in a first end for the second image sensor 1002. The sixth group of image sensor element(s) 1006 is used to record a second baseline calibration value. A non-transparent structure may be positioned in close proximity of the third group and the sixth group of image sensor element(s) to prevent light from reaching the third and sixth group of image sensor element(s). A calibration signal may be generated for each of the first and the second image sensor 1001 1002 using the principles discussed above or below e.g. in relation to FIG. 9a-b.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components, but does not preclude the presence or addition of one or more other features, integers, steps, components or groups thereof.

The invention claimed is:

1. A method of scanning a physical medium by an image scanner comprising a first image sensor having a plurality of image sensor elements that provide image signals recorded at a first area of the physical medium, and a first light source associated with said first image sensor, said method comprising:

guiding light emitted from said first light source towards a first group of image sensor element(s) positioned in a first end of said first image sensor, recording a first light calibration value using said first group of image sensor element(s) indicative of a light intensity, at a first end of the first image sensor, of the light generated by the first light source;

repeating the guiding and the recording using a second group of image sensor element(s) positioned in a second end of said first image sensor, thus resulting in a second light calibration value indicative of a light intensity, at a second end of the first image sensor, of the light generated by the first light source; and generating a first compensation signal for image sensor elements positioned between said first and said second group of image sensor element(s) by processing said first and said second light calibration value together;

compensating said image signals provided by said first image sensor using said first compensation signal for variations in light intensity of the first light source and sensitivities of the image sensor elements of the first image sensor.

2. A method according to claim 1, where the first compensation signal comprises a first part having an average slope that is larger than an average slope of a second part of the first compensation signal.

3. A method according to claim 1, where the first part of the compensation signal constitutes at least 5% of the first compensation signal, and/or the second part of the first compensation signal constitutes at least 30% of the first compensation signal.

4. A method according to claim 1, where each value of the first compensation signal is a weighted average of the first and the second light calibration value.

5. A method according to claim 1, where a third group of image sensor element(s) is used to record a baseline calibration value, said third group of image sensor element(s) being shielded from the light and wherein the step of generating the first compensation signal comprises processing the first calibration value, the second calibration value and the baseline calibration value together.

6. A method according to claim 1, where light is guided towards said first group of image sensor element(s) using a first light calibration unit, and the light is guided towards said second group of image sensor element(s) using a second light calibration unit.

7. A method according to claim 1, where the image scanner further comprises a second image sensor comprising a plurality of image sensor elements that provide an image signal recorded at a second area of the scanned physical medium, where a portion of the second area is recorded also by the first image sensors, whereby image data from overlapping and non-overlapping areas are present in the respective image signals, and a second light source associated with said second image sensor, said method further comprising:
guiding light emitted from said second light source towards a fourth group of image sensor element(s) positioned in a first end of said second image sensor, recording a third light calibration value using said fourth group of image sensor element(s) indicative of a light intensity, at the first end of the second image sensor, of the light generated by the second light source;
guiding the light emitted from said second light source towards a fifth group of image sensor element(s) positioned in a second end of said second image sensor, recording a fourth light calibration value using said fifth group of image sensor element(s) indicative of a light intensity, at the second end of the second image sensor, of the light generated by the second light source;
generating a second compensation signal for image sensor elements positioned between said fourth and said fifth group of image sensor element(s) of said second image sensor by processing said third and said fourth light calibration value together;
compensating said image signals provided by said second image sensor using said second compensation signal for variations in light intensity of the second light source and sensitivities of the image sensor elements of the second image sensor.

8. A method according to claim 1, where the image scanner further comprises a second image sensor comprising a plurality of image sensor elements that provide an image signal recorded at a second area of the physical medium, where a portion of the second area is recorded also by the first image sensors, whereby image data from overlapping and non-overlapping areas are present in the respective image signals, a second light source associated with said second image sensor, and a second shielding structure associated with said second image sensor shielding a sixth group of image sensor elements from direct and reflected light from the second light source and any other light sources, and said method further comprising:
recording a second baseline calibration value with said sixth group of image sensor element(s);
generating a second compensation signal for image sensor elements of said second image sensor by processing said second baseline calibration value;
compensating said image signals provided by said second image sensor using said second compensation signal for variations in light intensity of the second source and sensitivities of the image sensor elements of the second image sensor.

9. An apparatus for scanning comprising a first image sensor having a plurality of image sensor elements that provide an image signal recorded at a first area of a physical medium, a first light source associated with said first image sensor, a first light calibration unit configured to guide light from said first light source towards a first group of image sensor element(s) positioned in a first end of said first image sensor, a second light calibration unit configured to guide light from said first light source towards a second group of image sensor element(s) positioned in a second end of said first image sensor, and a processing unit for:
generating a first compensation signal for image sensor elements positioned between said first and said second group of image sensor element(s) by processing a first light calibration value recorded by the first group of image sensor element(s) together with a second light calibration value recorded by the second group of image sensor element(s);
compensating said image signals provided by said first image sensor using said first compensation signal for variations in light intensity of the first light source and sensitivities of the image sensor elements of the first image sensor.

10. A method of processing signals from a first image sensor having a plurality of image sensor elements that provide an image signal recorded at an first area of a physical medium, said method comprising:
obtaining a first light calibration value indicative of a light intensity at the first end of the first image sensor, of light generated by a first light source associated with said first image sensor;
obtaining a second light calibration value indicative of a light intensity, at a second end of the first image sensor, of the light generated by the first light source; and
generating a first compensation signal for image sensor elements positioned between said first and said second group of image sensor element(s) by processing said first and said second light calibration value together;
compensating said image signals provided by said first image sensor using said first compensation signal for variations in light intensity of the first light source and sensitivities of the image sensor elements of the first image sensor.

11. A non-transitory computer readable storage medium having stored thereon program codes adapted to cause a computer to perform the steps of the method according to claim 10, when said program codes are executed by the computer.

12. A method of scanning a physical medium by an image scanner comprising a first image sensor having a plurality of image sensor elements that provide image signals recorded at an first area of the physical medium, a first light source associated with said first image sensor, and a first shielding structure associated with said first image sensor shielding a third group of image sensor elements from direct and reflected light from the first light source and any other light sources, said method comprising:

recording a first baseline calibration value with said third group of image sensor element(s);

generating a first compensation signal for image sensor elements of said first image sensor by processing said first baseline calibration value;

compensating said image signals provided by said first image sensor using said first compensation signal for variations in light intensity of the first light source and sensitivities of the image sensor elements of the first image sensor.

* * * * *